US009159149B2

(12) United States Patent
Brodsky et al.

(10) Patent No.: US 9,159,149 B2
(45) Date of Patent: *Oct. 13, 2015

(54) VISUALIZING DATA TRANSFERS IN DISTRIBUTED FILE SYSTEM

(71) Applicant: International Business Machines Corporation, Armonk, NY (US)

(72) Inventors: Stephen A. Brodsky, Los Gatos, CA (US); Wim De Pauw, Tarrytown, NY (US); Eric C. Yang, San Jose, CA (US)

(73) Assignee: Interntional Business Machines Corporation, Armonk, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/804,192

(22) Filed: Mar. 14, 2013

(65) Prior Publication Data

US 2014/0280399 A1  Sep. 18, 2014

(51) Int. Cl.
*G06F 17/30* (2006.01)
*G06T 11/20* (2006.01)

(52) U.S. Cl.
CPC ........ *G06T 11/206* (2013.01); *G06F 17/30194* (2013.01); *G06F 17/30643* (2013.01); *G06F 17/30961* (2013.01)

(58) Field of Classification Search
CPC .................... G06F 17/30194; G06F 17/30643; G06F 17/30651; G06F 19/26; G06F 3/067; G06F 2211/1028; G06F 17/30283; G06F 17/30958
USPC ........................................................ 707/827
See application file for complete search history.

(56) References Cited

U.S. PATENT DOCUMENTS

| | | | |
|---|---|---|---|
| 6,496,208 B1 * | 12/2002 | Bernhardt et al. | 715/853 |
| 8,392,368 B1 * | 3/2013 | Kelly et al. | 707/634 |
| 8,768,981 B1 * | 7/2014 | Milne et al. | 707/822 |
| 2008/0155520 A1 * | 6/2008 | Meloche et al. | 717/157 |
| 2009/0083809 A1 * | 3/2009 | Hayashi et al. | 725/88 |
| 2010/0077101 A1 * | 3/2010 | Wang et al. | 709/238 |
| 2011/0283260 A1 | 11/2011 | Bucuvalas | |
| 2012/0030572 A1 | 2/2012 | Karenos et al. | |
| 2012/0072367 A1 | 3/2012 | Reisbich | |
| 2012/0144376 A1 | 6/2012 | Van Eijndhoven et al. | |

(Continued)

FOREIGN PATENT DOCUMENTS

| | | |
|---|---|---|
| EP | 1317713 | 6/2003 |
| WO | 2011137386 | 11/2011 |

OTHER PUBLICATIONS

Vo et al., "Parallel Visualization on Large Clusters using Map Reduce", IEEE Symposium on Large Data Analysis and Visualization Oct. 23-24, 2011 Providence Rhode Island, USA.

(Continued)

*Primary Examiner* — Thanh-Ha Dang
(74) *Attorney, Agent, or Firm* — Scully, Scott, Murphy & Presser, P.C.; Nidhi Garg, Esq.

(57) ABSTRACT

Data transfers within and between nodes in a distributed computing environment are visualized. In one aspect, the nodes are represented as geometrical shapes. The first part of the geometrical shape represents logic of the corresponding node. The second part of the geometrical shape represents storage of the corresponding node. A line connecting the first part and the second part represents data transfer between logic of a node and storage of a node. Both inter-node and intra-node transfers may be shown.

16 Claims, 15 Drawing Sheets

(56) References Cited

U.S. PATENT DOCUMENTS

| | | | |
|---|---|---|---|
| 2012/0166726 A1* | 6/2012 | De Schrijver et al. | 711/114 |
| 2013/0024412 A1* | 1/2013 | Gong et al. | 706/46 |
| 2013/0246731 A1* | 9/2013 | Lee et al. | 711/170 |
| 2013/0286579 A1* | 10/2013 | De Spiegeleer et al. | 361/679.33 |
| 2013/0304706 A1* | 11/2013 | MacInnis | 707/658 |
| 2014/0025909 A1* | 1/2014 | Naor et al. | 711/162 |

OTHER PUBLICATIONS

Huang et al., "MR-Scope: A Real-Time Tracing Tool for MapReduce" HPDC'10, Jun. 20-25, 2010, Chicago, Illinois, USA.

Tan et al., "Visual, Log-based Causal Tracing for Performance Debugging of MapReduce Systems" Distributed Computing Systems (ICDCS), 2010 IEEE 30th International Conference on.

Pallickara et al., "Granules: A Lightweight, Streaming Runtime for Cloud Computing With Support for Map-Reduce" Cluster Computing and Workshops, 2009. Cluster '09. IEEE International Conference on.

Fonseca et al., "X-Trace: A Pervasive Network Tracing Framework," Appears in the 4th USENIX Symposium on Networked Systems Design & Implementation (NSDI'07), Apr. 2007.

* cited by examiner

☐ READ TRANSFERS ☐ WRITE TRANSFERS ☑ SHUFFLE TRANSFERS
☑ READ FROM STORAGE ☐ READ BY CLIENT DST ☑ WRITTEN TO STORAGE ☐ WRITTEN BY CLIENT

FIG. 11

VISUALIZING DATA TRANSFERS IN DISTRIBUTED FILE SYSTEM

FIELD

The present application relates generally to computers, and computer applications, and more particularly to a visualization of system behavior aspects.

BACKGROUND

Understanding the behavior, finding problems or bottlenecks is very challenging for any systems with more than a few nodes. For example, the complexity arises from data transfers that span thousands of nodes (spatial complexity); the data transfers that are transient and change quickly over time; data transfers that vary in size, transfer speed, and the job from where they originate; data transfers that vary in the trajectory from their source to origin; data transfers between two nodes that are on different racks (subnets). Visualizing statistics about the logic in the nodes, the data storage in the nodes, transfers of data between the nodes is a complex task.

BRIEF SUMMARY

A method of visualizing data transfers in a distributed computing environment, in one aspect, may comprise receiving information associated with the data transfers. The information may comprise at least information associated with a plurality of nodes in the distributed computing environment. The method may further include visualizing the plurality of nodes in the distributed computing environment, a node in the plurality of nodes represented as a geometrical shape, a first part of the geometrical shape representing logic of the node and a second part of the geometrical shape representing storage of the node. A line connecting the first part and the second part represents data transfer between the first part and the second part. A spline connecting two of the geometrical shape each of which represents a different node in the plurality of nodes, represents inter-node data transfer between logic and storage of said two different nodes.

A system for visualizing data transfers in a distributed computing environment, in one aspect, may comprise a visualization module operable to execute on a processor and further operable to receive information associated with the data transfers. The information may comprise at least information associated with a plurality of nodes in the distributed computing environment. The visualization module may be further operable to visualize the plurality of nodes in the distributed computing environment. A node in the plurality of nodes may be represented as a geometrical shape. A first part of the geometrical shape may represent logic of the node and a second part of the geometrical shape may represent storage of the node. A line connecting the first part and the second part represents data transfer between the first part and the second part. A spline connecting two of the geometrical shape each of which represents a different node in the plurality of nodes, represents inter-node data transfer between logic and storage of said two different nodes. A graphical user interface module may be operable to present the visualized data transfers among the plurality of nodes. The graphical user interface module may further allow interaction with the visualized data transfers among the plurality of nodes.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 11 shows a checkbox graphical user interface in one embodiment of the present disclosure.

DETAILED DESCRIPTION

Figure 1:
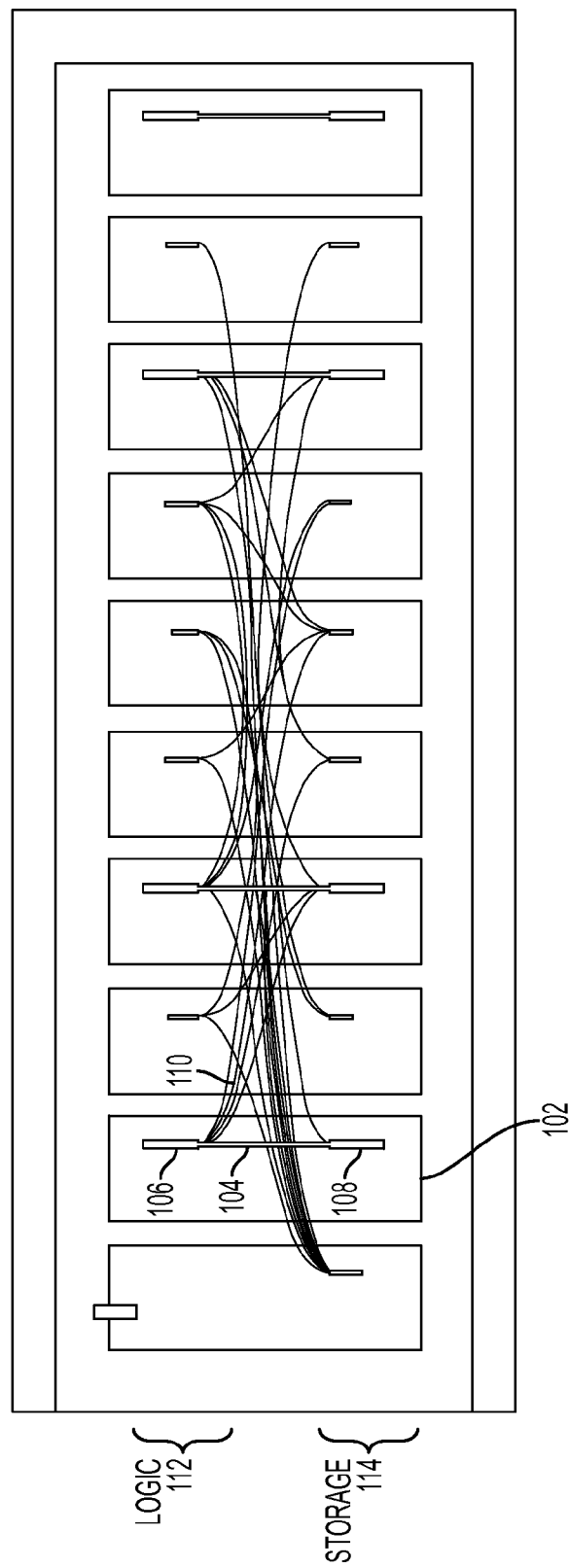
FIG. 1 shows visualization of HDFS writes in one embodiment of the present disclosure.

A visualization methodology of the present disclosure may be embodied as a method, a system, and/or computer instructions programmed on a circuit, stored on a computer storage device or another device which may drive a hardware processor or computer to perform the visualization disclosed herein.

A methodology of the present disclosure in one embodiment visualizes the data transfers by file system (e.g., HDFS) writes and reads, and e.g., as well as shuffles in a Map Reduce system, in a scalable way. The visualization of the present disclosure shows nodes (a node can correspond to a physical machine, or a virtual machine in a cloud), their logic and their storage, data transfers between a node's logic and storage, and data transfers between different nodes. The visualization shows nodes, organized by racks. For simplicity, the present disclosure assumes that each rack has its own subnet. Nodes within the same rack (subnet) are aligned horizontally. Inside each node, the visualization in one embodiment of the present disclosure represents the node logic (the one or more applications running on this node) at the top, and the node data storage (typically disk drives) at the bottom. Statistics for file system (e.g., HDFS) reads, writes and map reduce shuffles are depicted as small bars varying sizes at the location of the logic or the data storage. For example, the aggregate amount of data received or sent during a certain period may be shown by line thickness. In the present disclosure, the methodologies are described with respect to Hadoop as an example distributed file system. It is noted, however, that the methodologies may apply to other distributed file systems, for instance, another file system that implements MapReduce techniques, or divides work across a distributed system compute nodes.

In one embodiment, data transfers between the logic and the data storage are represented as splines connecting the relevant logic and data storage, the thickness of which represents the amount of data transferred. To accommodate large numbers of nodes, the visualization of the present disclosure in one embodiment organizes the nodes in rows representing their racks (subnets). Each rack (subnet) is represented as a horizontal slab, containing its nodes.

Drawing data transfers between nodes located on different racks might cause a messy layout. To avoid this, the visualization of the present disclosure in one embodiment represents the data transfers between nodes from different racks as inter-rack data transfers on the side, as will be shown below. The proposed layout of nodes and data transfers between them can also be augmented with more traditional resource information, by adding indicators to a node representing its central processing unit (CPU) usage, available memory, garbage collection (GC) statistics, System input/output (I/O), etc.

As an example, consider a MapReduce or Hadoop system that uses HDFS (Hadoop Distributed File System) to exchange data between different nodes. Data can be exchanged with HDFS writes or reads. In addition, data is exchanged during Map Reduce shuffles. Most Map Reduce systems record these various data transfers in log files. However, understanding the behavior, finding problems or bottlenecks based on reading these logs is very challenging for any systems with more than a few nodes. For example, the complexity arises from the following: 1. data transfers in a Map Reduce system may span thousands of nodes (spatial complexity); 2. data transfers in a Map Reduce system are transient phenomena and change (sometimes quickly) over time; 3. data transfers in a Map Reduce system may vary in size, transfer speed, and the job that they originate from; 4. data transfers may vary in the trajectory from their source to origin: in the most efficient case, data is transferred locally between the node logic and its data storage; data transferred to or from the logic of a node to the data storage of another in the same rack (same subnet) is less efficient than a local transfer; a transfer between two nodes that are on different racks (subnets) tend to be the slowest.

Map Reduce configurations with thousands of nodes are expected to have failing (logic) nodes or data storage nodes over time. The Map Reduce system can deal with such failures, albeit at a cost of decreased performance. Therefore, it is important for an administrator to see which nodes are failing. Visualizing statistics about the logic in the nodes, the data storage in the nodes, transfers of data between the nodes, from HDFS writes and reads, and from map reduce shuffles requires taking into account multiple dimensions.

Two types of visualizations are typically used to show traffic between nodes: a graph, e.g., as used for analysis of social networks and as a matrix. In a graph type of visualization, clustering may be used to group nodes. The problem with this representation is that the "computer" nodes in a graph contain two subnodes, namely the logic of the node and the data storage of the node. Incorporating this in a free-form graph would cause even more clutter. Another drawback with this representation is that the density of useful information may not be very high. A second type of visualization is a matrix, e.g., sender-receiver matrix, where a cell indicates a call from a node represented by the corresponding row, to a node represented by the corresponding column of the cell. Even though the density of the useful information is high, this representation is not very intuitive for users to understand communication between nodes.

FIG. 1 shows a visualization of HDFS writes (statistics) in one embodiment of the present disclosure. The lines 104 and 110 represent HDFS writes of data from node logic onto node data storage. The vertical rectangles 102 represent nodes. The top area 112 of the rectangle (node) 102 may represent the logic and the bottom area 114 of the rectangle (node) 102 may represent the data storage associated with that node. The size of the small rectangles 106 at the top represent the amount of data that is written by the logic of the nodes, the small rectangles at the bottom 108 represent the data written to the data storage of the nodes. Vertical lines 104 represent a local transfer (from logic to data storage on the same node). The splines 110 indicate HDFS writes from the logic of the nodes to data storage of different nodes in this rack (subnet). The elements 102, 104, 106, 108, 110 may also be color coded with different colors in one embodiment of the present disclosure. Different shapes other than rectangles may be utilized for visualizing the elements.

Figure 2:
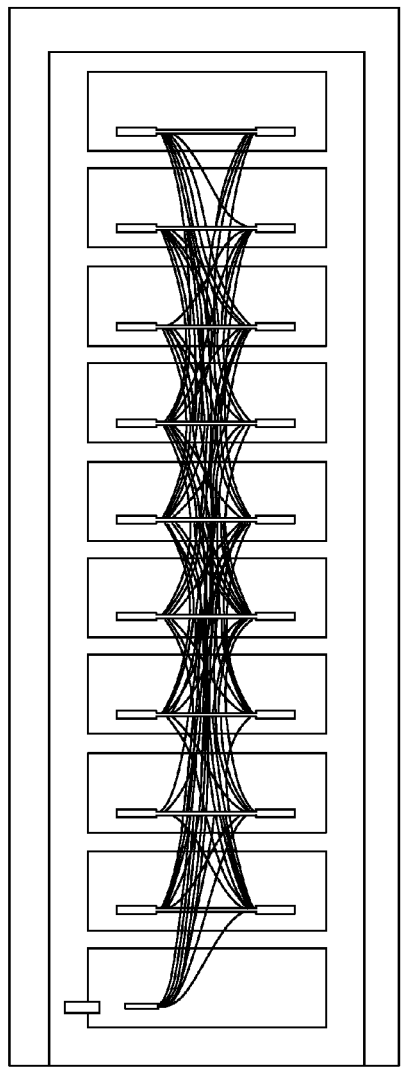
FIG. 2 illustrates HDFS reads for the logic, data storage, and the transfers between them in one embodiment of the present disclosure.

FIG. 2 illustrates HDFS reads (statistics) for the logic, data storage, and the transfers between them, similar to the HDFS writes shown in FIG. 1 in one embodiment of the present disclosure. For HDFS reads, data is transferred from the data storage (at the bottom) to the logic (at the top).

Figure 3:
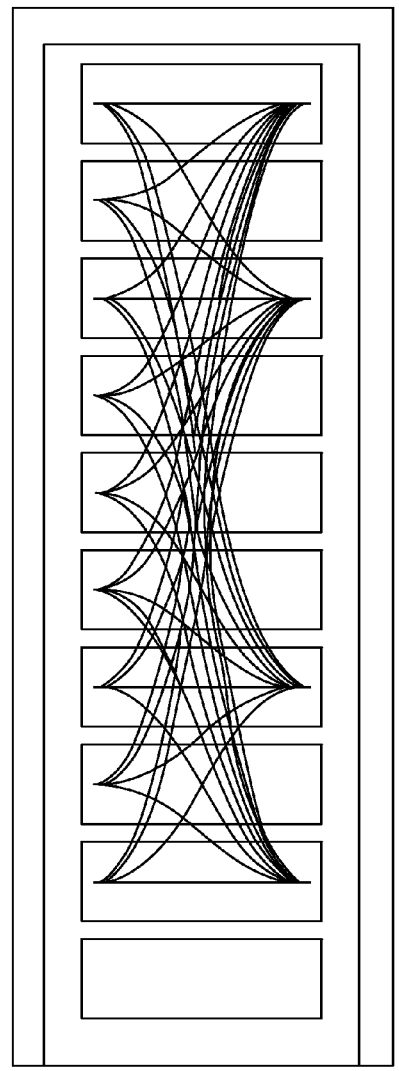
FIG. 3 shows data transfer caused by map reduce shuffles in one embodiment of the present disclosure.

FIG. 3 shows the data transfer caused by the map reduce shuffles in one embodiment of the present disclosure, similar to the HDFS writes and reads shown in FIG. 1 and FIG. 2, respectively.

Figure 4:
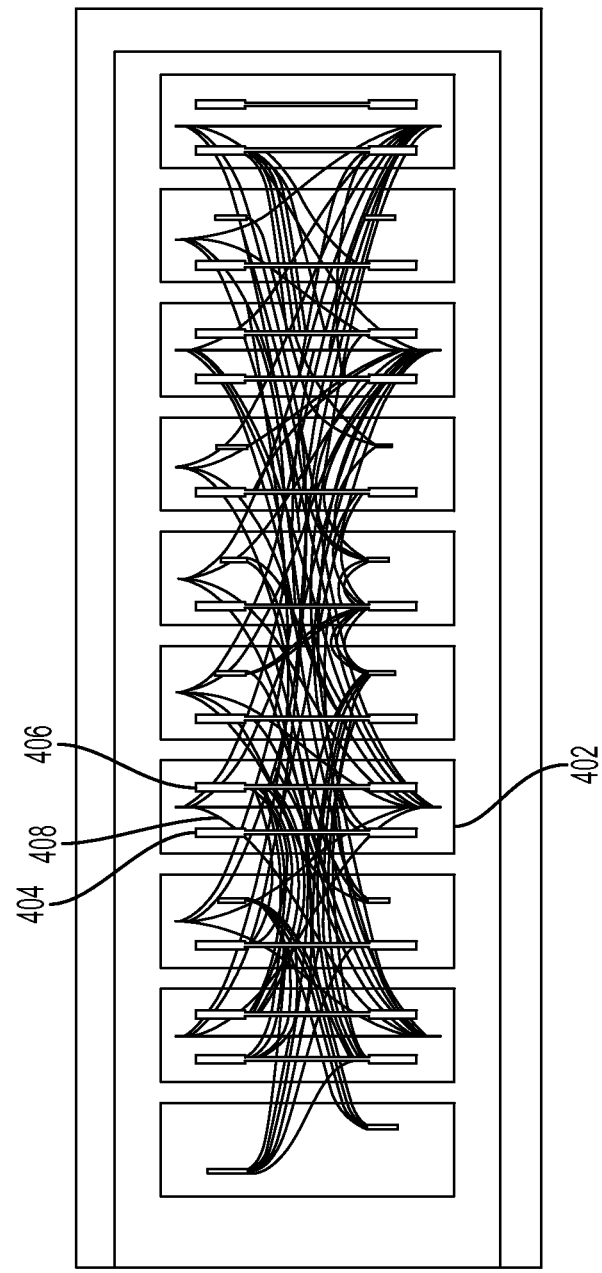
FIG. 4 shows the combination of HDFS writes, reads, and map reduce shuffles in one embodiment of the present disclosure.

FIG. 4 shows the combination of the HDFS writes (which may be color coded, e.g., red), reads (e.g., blue), and map reduce shuffles (e.g., green)). Nodes are visualized as rectangles (e.g., 402). Data read between logic and data storage in the same node are visualized at 404, the top portion representing logic and the bottom portion representing data storage in the node 402, and the data transfer visualized as a straight line between the top and the bottom. Similarly, data writes are visualized at 406. Likewise, map reduce shuffles are visualized at 408.

Figure 5:
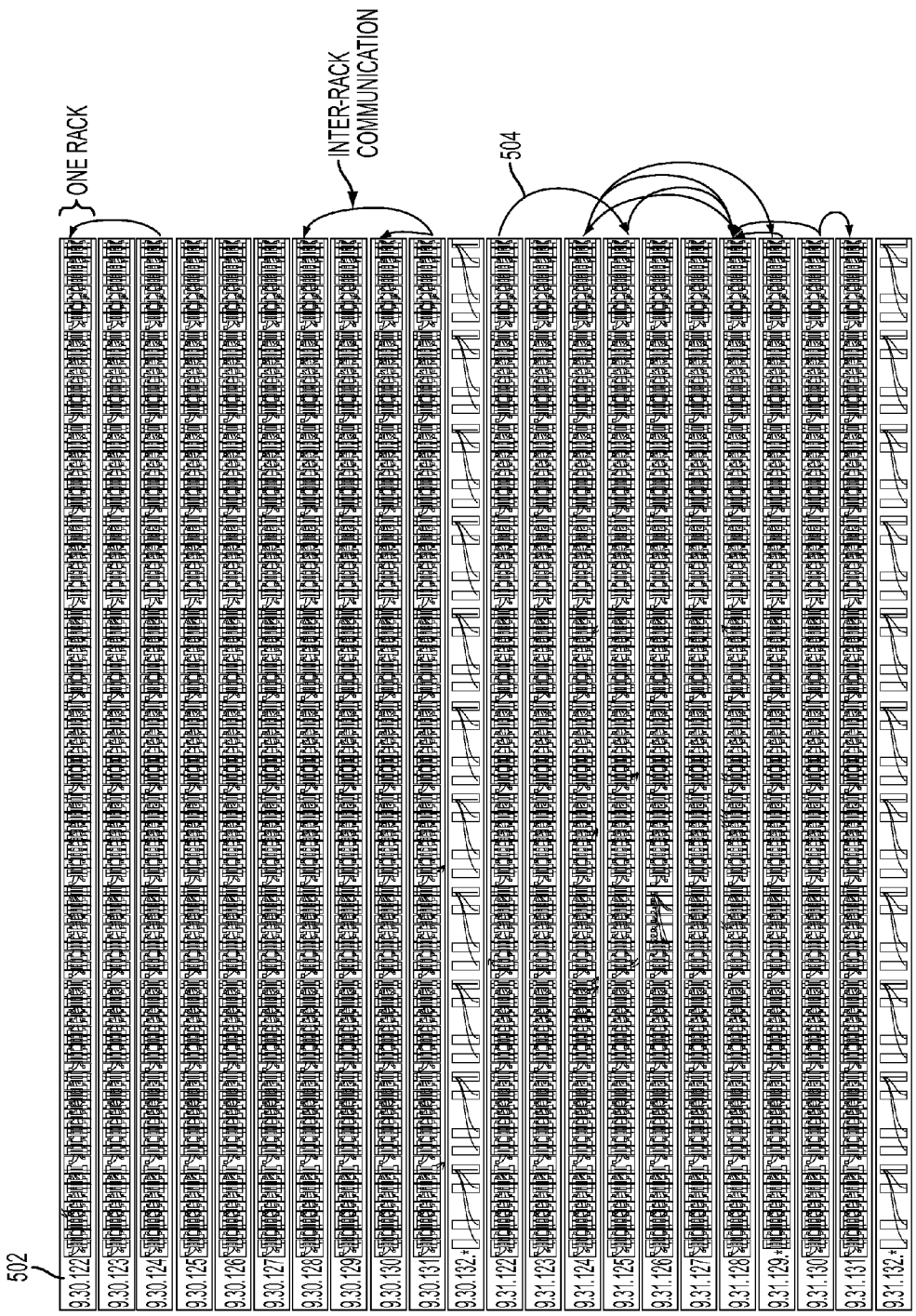
FIG. 5 shows a configuration with multiple racks in one embodiment of the present disclosure.

FIG. 5 shows a configuration with multiple racks in one embodiment of the present disclosure, each containing about a hundred nodes. The visualization at FIG. 5 thus may show a configuration with more than 2000 nodes. The racks are labeled with their subnet on the left (e.g., 9.30.122.* for the topmost rack) 502. Data transfers between nodes that are on different racks are shown by the curved arrows on the right side 504. These arrows indicate aggregate data transfer between two racks.

This visualization can reflect statistics on a sliding time window, or in a cumulative way. It can also highlight current transfers by drawing these in a brighter color when they start until the finish of the transfer. The current visualization organizes and clusters the nodes by subnet (rack), however, alternative groupings can be used, such as application or workflows. In an alternative embodiment, the nodes can be arranged on a circle instead of a matrix layout.

Figure 6:
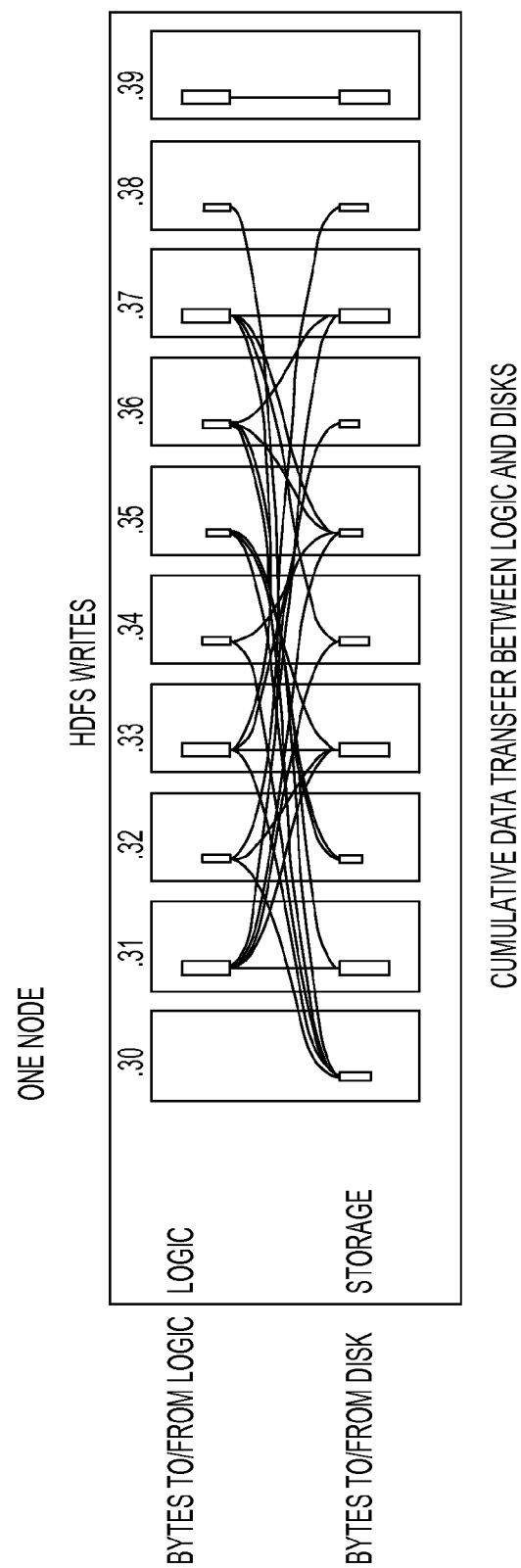
FIG. 6 shows another example visualization of HDFS writes in one embodiment of the present disclosure.
Figure 7:
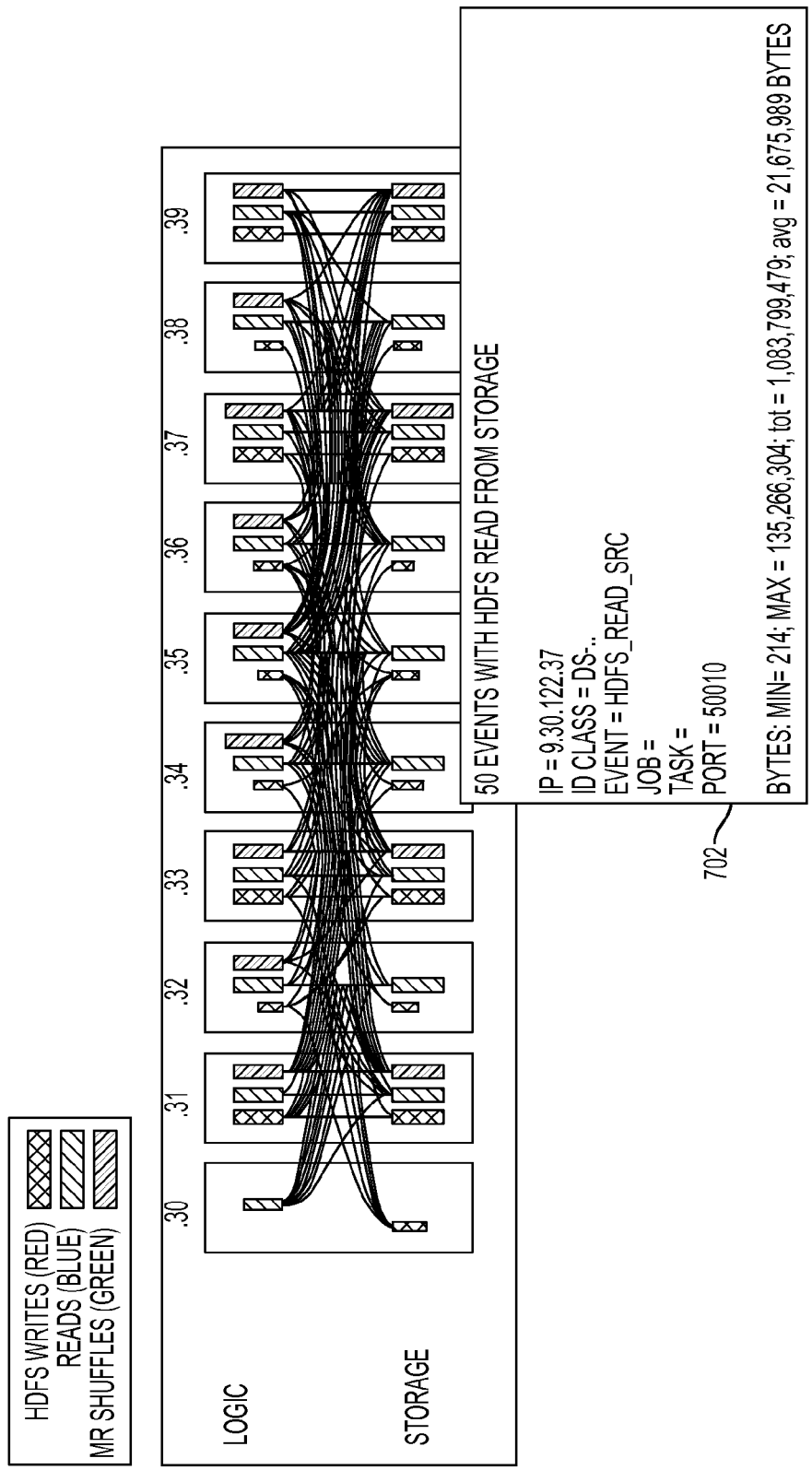
FIG. 7 shows another example visualization of a combination of writes, reads and shuffles in another embodiment of the present disclosure.

FIG. 6 shows another example visualization of HDFS writes. FIG. 7 shows another example visualization of a combination of writes, reads and shuffles.

Figure 8:
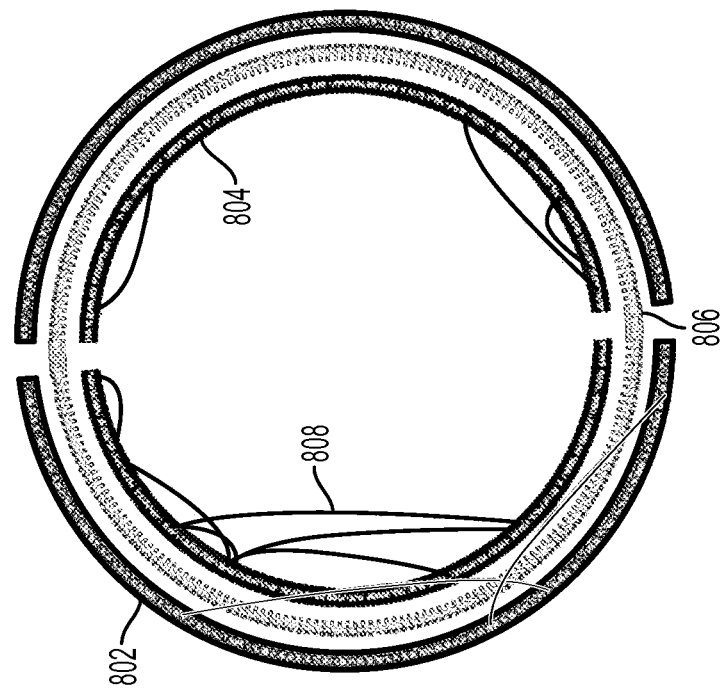
FIG. 8 shows a visualization of system behavior as a circular or radial layout in another embodiment of the present disclosure.

FIG. 8 shows a visualization for instance of system behavior as a circular or radial layout in another embodiment of the present disclosure. The HDFS writes 802, reads 804, and Map Reduce shuffles 806 are represented as nodes on concentric circles (e.g., respectively in red, blue, green). In this embodiment, each node is positioned on a circle, e.g., with logic on outside, storage on inside. Similar to the matrix layout shown in FIG. 1, e.g., local and non-local data transfers may be visualized or drawn as a line or spline. For example, local data transfer (data transfer in the same machine, e.g., between 904 and 906) may be drawn as a radial line 908. Nearby data transfer (data transfer between the machines on the same rack) may be drawn as a spline 910 that goes in between nodes. Far data transfer (data transfer between different machines on different rack) may be shown as large splines inside the circle (808).

Figure 9:
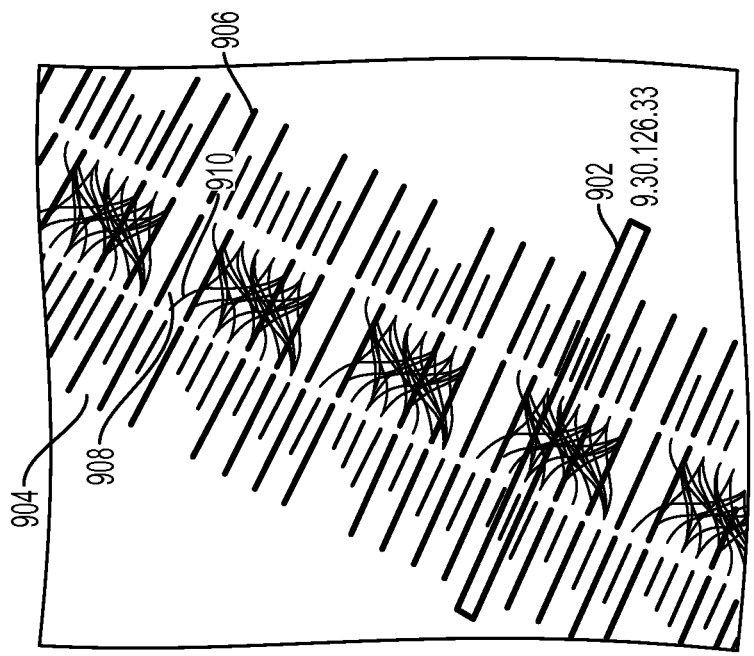
FIG. 9 shows a detail view of FIG. 8 in one embodiment of the present disclosure.

FIG. 9 shows a detail view of FIG. 8. One angle 902 (shown in yellow) represents an IP node. For a particular angle, outermost bar (e.g., 904) represent the logic, while the innermost bar (e.g., 906) represents the data storage. Connections (e.g., 908) between outer and inner bars represent data transfers, which can be local (on the same IP address) or not local. For a non-local transfer on the same rack, the connection (e.g., 910) is routed in between the inner and outer bars. For a data transfer that goes between different racks, the connection may be drawn as a spline 808 that goes to the inside of the circle as shown on FIG. 8.

Comparing the matrix layout shown in FIG. 5 to the circular layout in FIG. 8 reveals that the circular layout shows the inter-rack trajectories more efficiently, however, the graphical information density is more evenly distributed in the matrix layout. FIG. 5 and FIG. 8 represent the same data, but it may be more difficult to read the details of FIG. 8.

The visualization methodology of the present disclosure in one embodiment also may support interactions. For instance, a time window may be specified for which the above node and transfer statistics apply. This can be implemented with a simple slider on a time scale, or a start and end slider on a time scale. Such a time slider may be coupled with an animated playback.

A user may interact with the visualization by hovering the mouse over an element. For example, hovering over a node may bring up a tooltip with detailed statistics for this node. An example of such tool tip is shown in FIG. 7 at 702. Hovering over a data transfer line or spline may show the statistics for this transfer in the tooltip.

In another aspect, checkboxes may be provided in this visualization that allow the user to select to show or hide certain aspects of the visualization. FIG. 11 shows the checkbox graphical user interface in one embodiment of the present disclosure. As an example of interaction, checking the boxes will hide or show the selected metric.

The interaction may also allow selecting of showing data based on a threshold, e.g., showing data that are only above or below a threshold. The threshold is configurable by a user. For example, a user may ask to highlight nodes that have not received or sent data within a given time period. Or a user may ask to highlight the top N receivers of data as a result of shuffles. Interaction also may include navigating the view based on the data. For example, right-clicking on a node and selecting "Show data flow" may show the paths along which data from this node to other nodes was flowing. Interaction also may include the ability of a user to set notifications: e.g., when a statistic exceeds a given window, the visualization may alert the user by highlighting the contributing nodes or connections. A user may set a threshold to trigger an alert when a value in the gathered statistics gathered exceeds the threshold value.

Yet in another aspect, patterns may be extracted to address the complexity of very large clusters, e.g., similar pattern from groups of communicating nodes may be extracted and these patterns depicted as in FIGS. 1-3. Another pattern extraction example may be showing shuffles from a number of mappers (e.g., 10 mappers) to a number of reducers (e.g., 4 reducers). Patterns may be extracted over a time interval, for one or more features to be shown (e.g., HDFS writes and reads), by considering the clusters of nodes joined to each other by these factors, and/or by partitioning these clusters based on similar graph of connections (e.g., homomorphic graphs).

Figure 10:
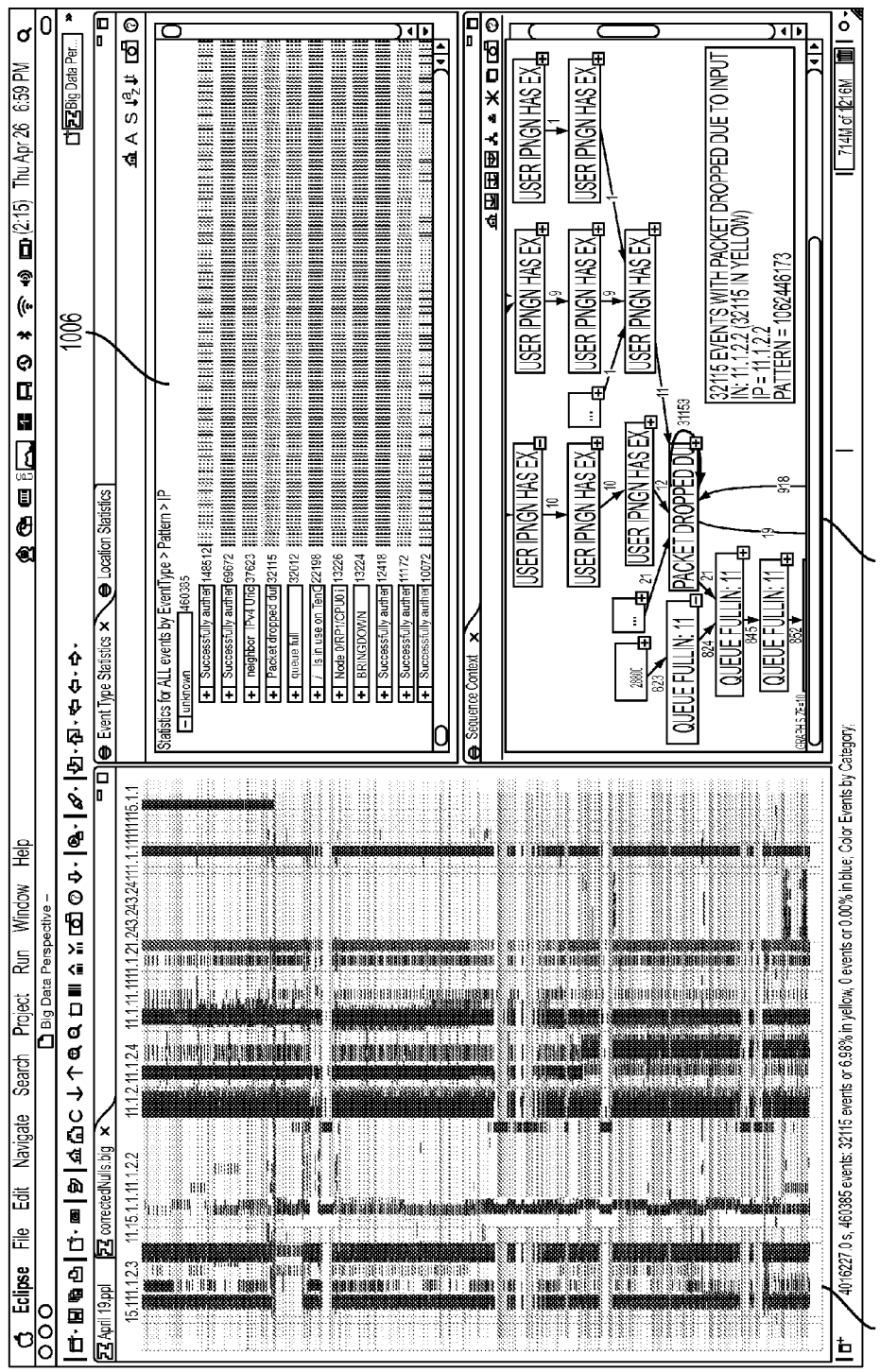
FIG. 10 shows a screen shot of a user interface that may present the visualization of the present disclosure and enable interactions.

FIG. 10 shows a screen shot of a user interface that may include the visualization of the present disclosure and enable interactions. The user interface shown in FIG. 10 illustrates an event analysis environment for events that may include HDFS data transfer events, but may also include other events generated by systems. The panel or window at 1002 shows events over time (laid out vertically) and in space (laid out horizontally). The panel or window at 1004 shows an analysis of common sequences in a series of general events (not limited to HDFS events). The panel or window at 1006 shows event type statistics. For example, the user interface of the present disclosure may enable a user to filter the visualization by desired criterion. For instance, the visualization at 1002 may be filtered by one or more event types and shown at 1006. The HDFS visualization described in this disclosure would fit in this kind of an event analysis environment, since it would allow the user to navigate from one view to another, to see the data in different perspectives.

The visualization of the present disclosure may be applicable to domains other than in showing system behavior. For example, in finance domain, flows of financial information (e.g., money) in organizations may be visualized according to a methodology of the present disclosure. The nodes may represent departments and the splines may represent financial instrument (e.g., money) flows. For instance, "HDFS write" may be replaced with "money coming in at a department and saved in a fund." Local transfer would be to the department's own funds, non-local transfer would be to another department's funds. "HDFS reads" may be replaced with "money taken from a fund of a department (e.g., shown at the bottom of a node) and spent (e.g., by the same department and/or another department).

Figure 12:
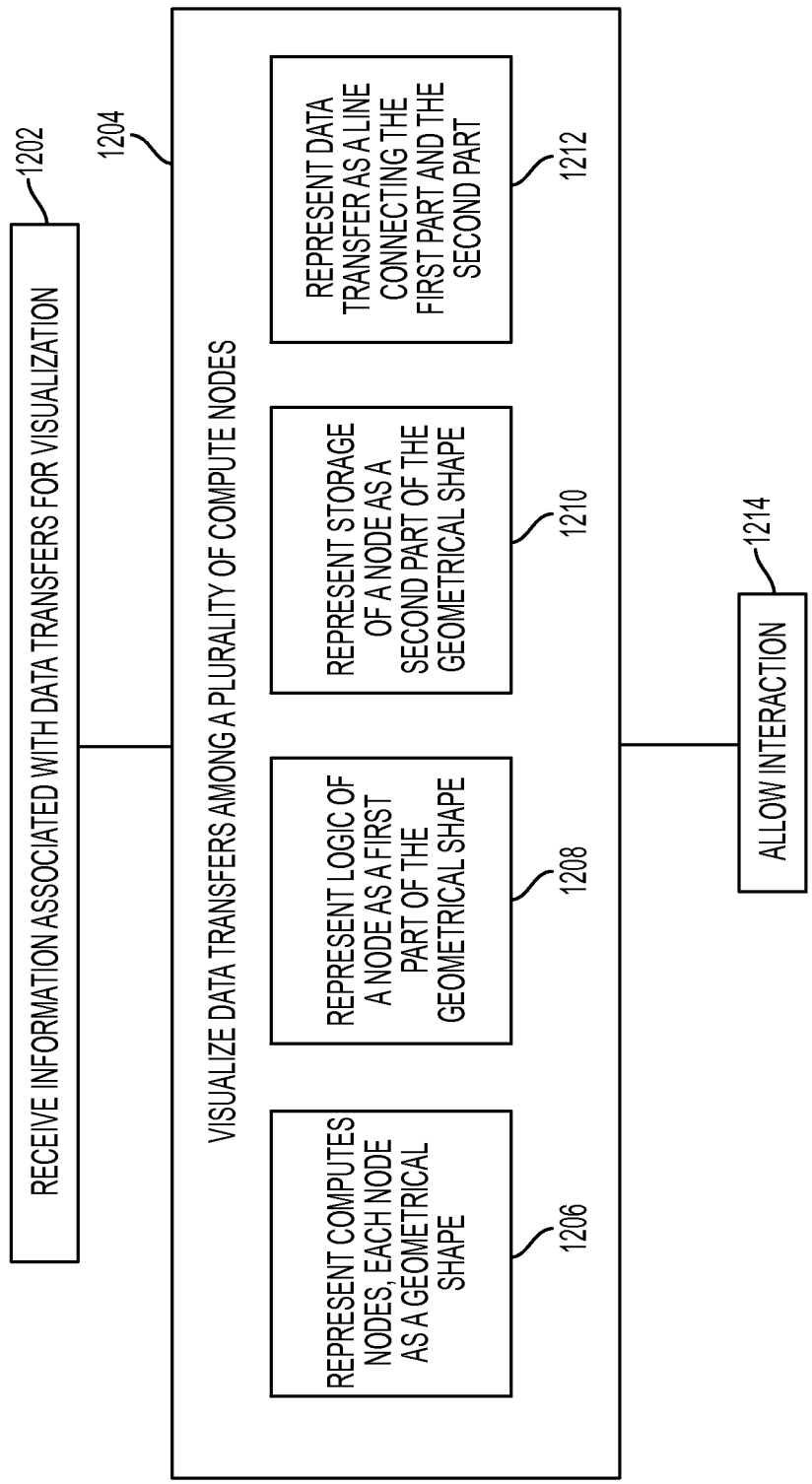
FIG. 12 illustrates a method of visualizing data transfers in one embodiment of the present disclosure.

FIG. 12 illustrates a method of visualizing data transfers in one embodiment of the present disclosure. At 1202, visualizing data transfers, e.g., in HDFS, may include determining and/or receiving information associated with the data transfers for visualization. For HDFS, such may be information about one or more racks, one or more computer nodes on the one or more racks, data transferred between logic of a compute node and storage of the same or another compute node, types of data transfer, e.g., data write, read, or map reduce shuffle.

At 1204, data transfers may be visualized and presented, e.g., via a graphical user interface. For instance, a compute node may be represented as a geometrical shape, e.g., a rectangle at 1206. At 1208, logic of the node may be represented as a first part of the geometrical shape, e.g., a smaller rectangle inside the node geometrical shape. Likewise, at 1210, storage of a node may be represented as a second part of the geometrical shape, e.g., another smaller rectangle inside the node geometrical shape. Data transfer between the logic and storage of the same or different nodes (same or different geometrical shape) may be represented as a line or spline connecting the two smaller rectangles at 1212. The visualization may be presented via a graphical user interface, e.g., in a window or a panel of a screen.

At 1214, user interaction may be allowed via the graphical interface, e.g., by using an input device or mechanism, such as mouse, touch screen, and others. For instance, a user may select or filter desired views, e.g., by event types, select to view statistics on the data transfers, etc.

Figure 13:
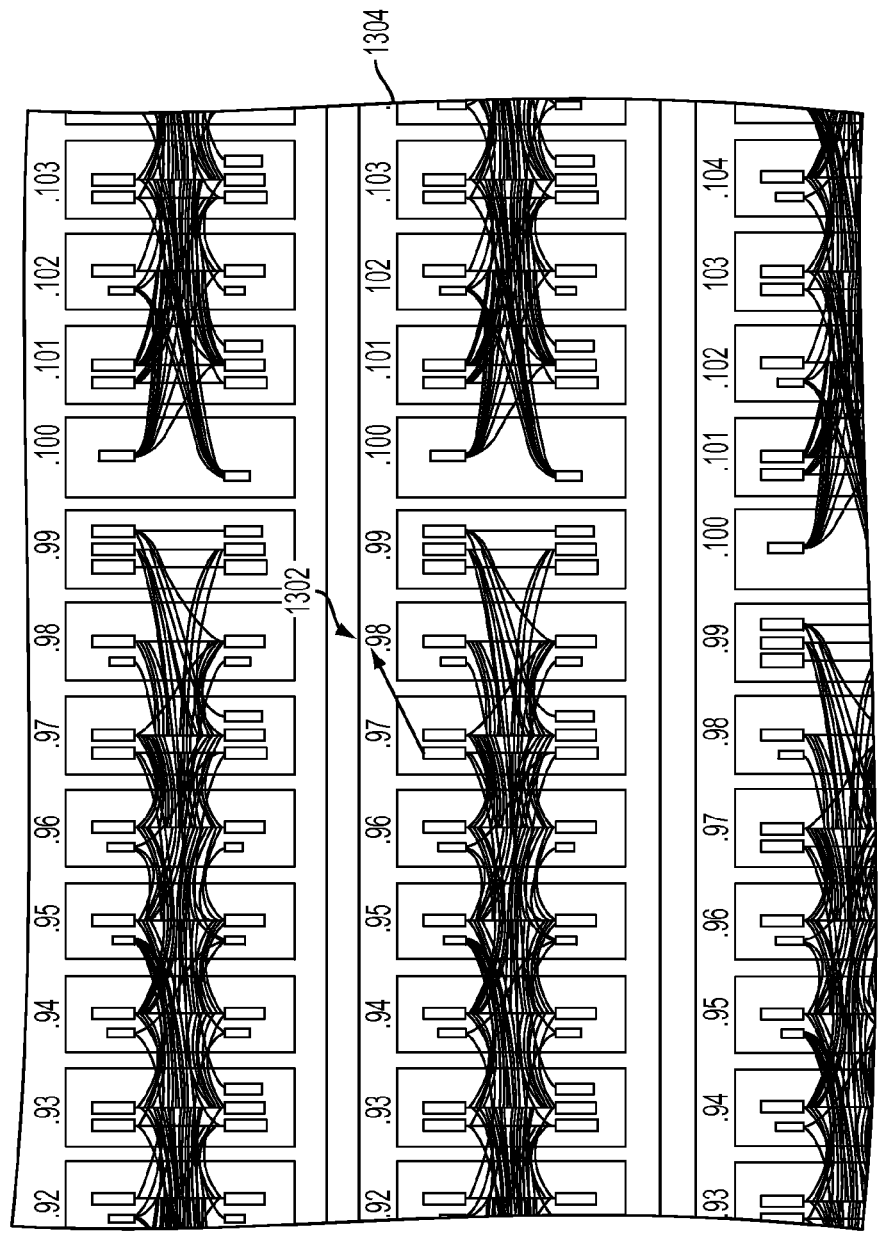
FIG. 13 illustrates another example of visualizing inter-rack communication.
Figure 14:
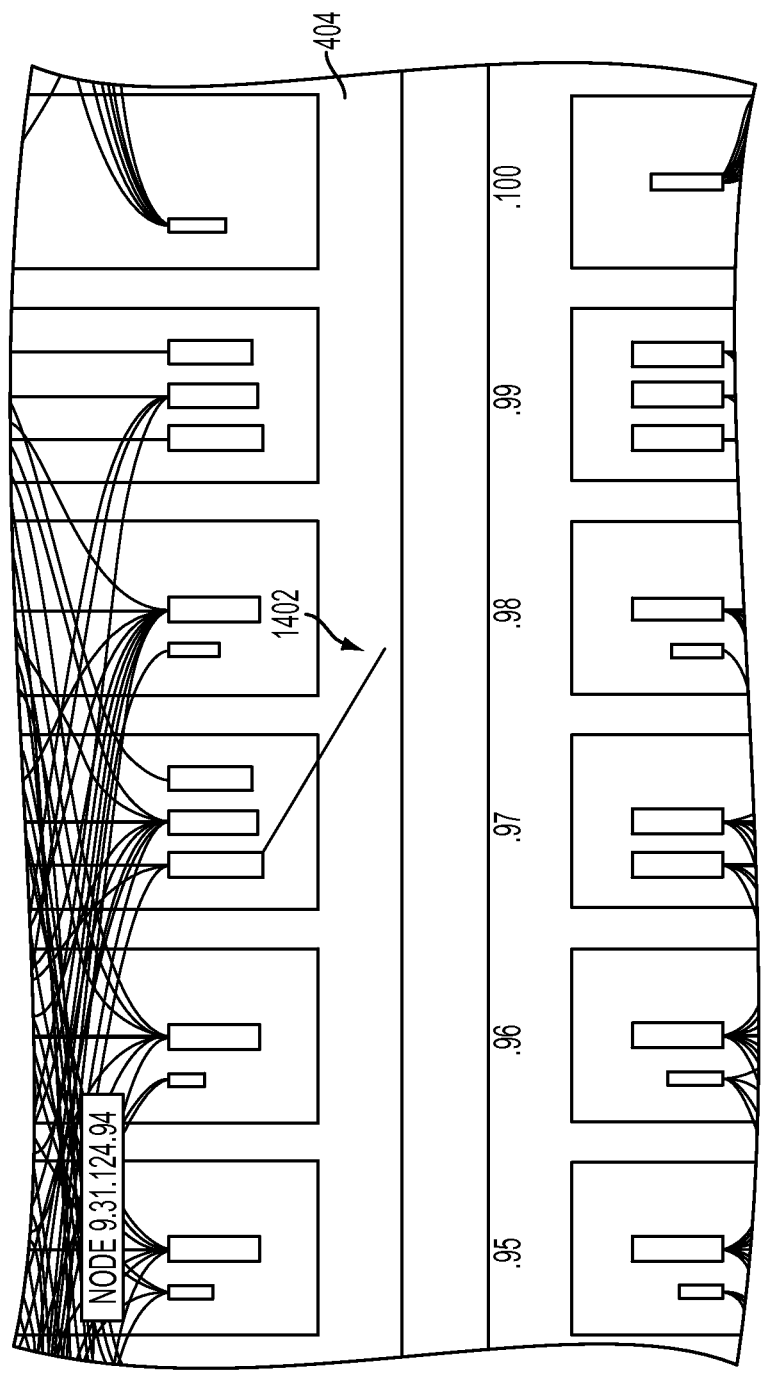
FIG. 14 illustrates yet another example of visualizing inter-rack communication in one embodiment of the present disclosure.
Figure 15:
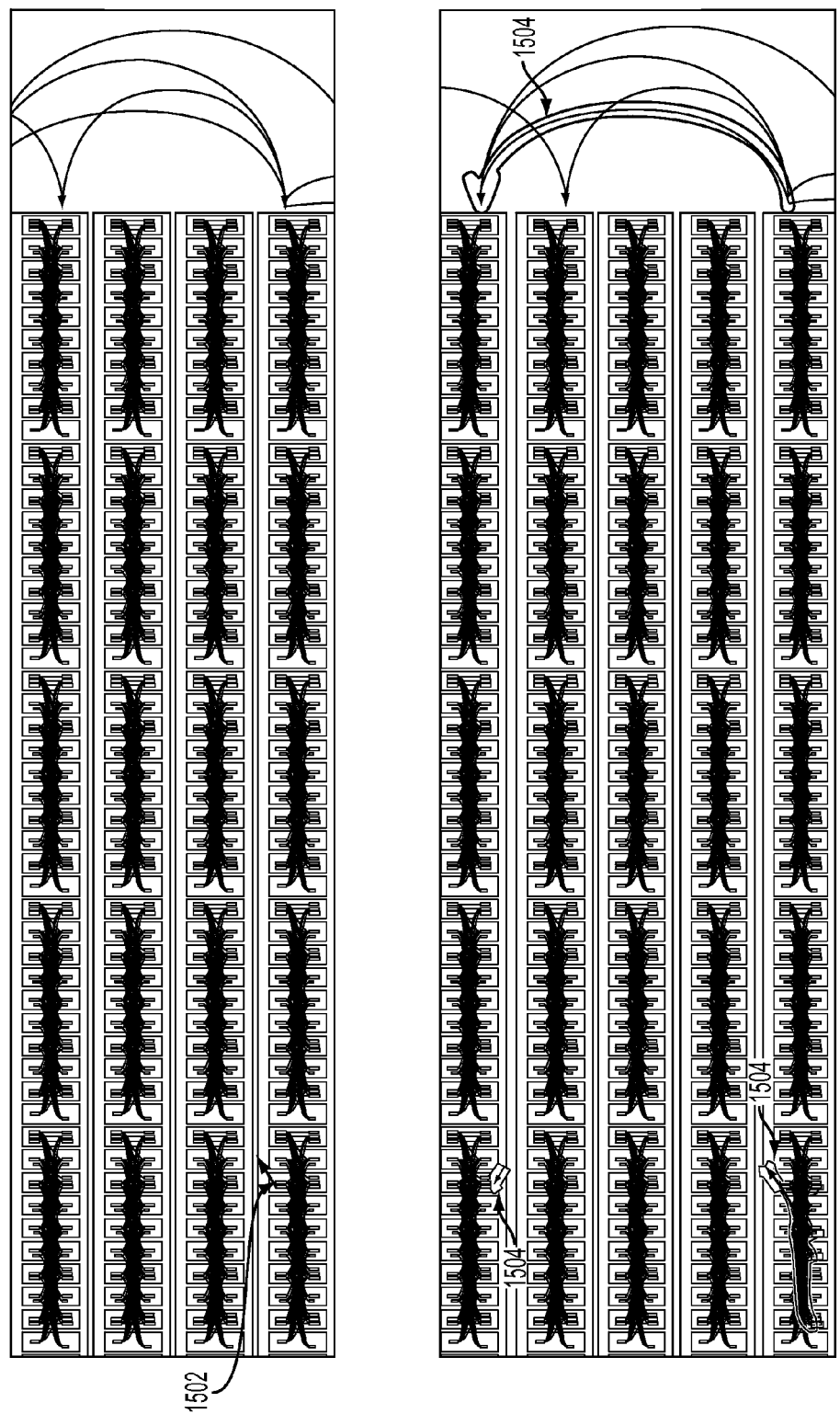
FIG. 15 illustrates still yet another sample of visualizing inter-rack communication in one embodiment of the present disclosure.
Figure 16:
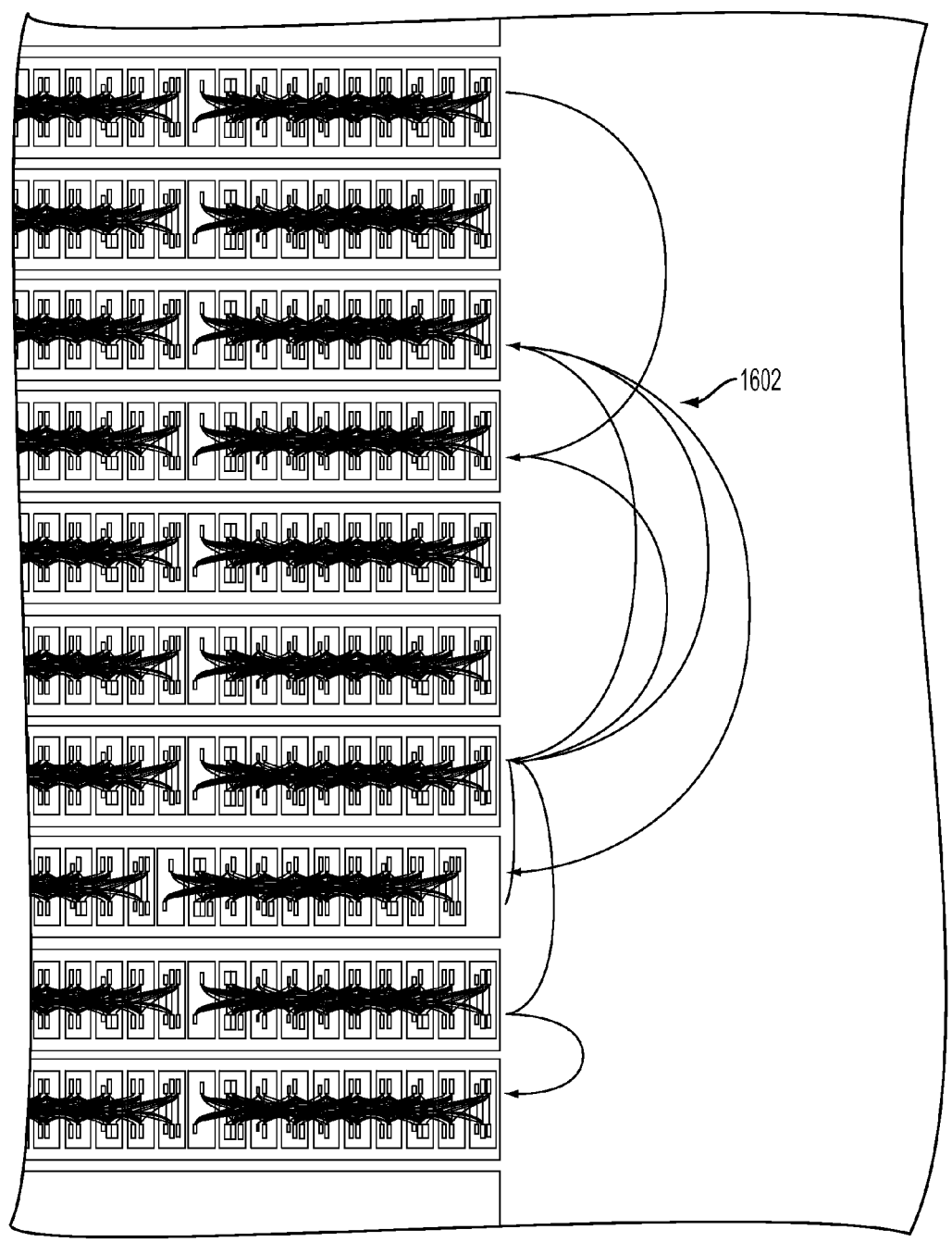
FIG. 16 illustrates yet another example of visualizing inter-rack communication in one embodiment of the present disclosure.

FIG. 13 illustrates another example of visualizing inter-rack communication. At 1302, outgoing arrow (e.g., color coded red) indicating HDFS writes points to "outside" the current rack 1304. FIG. 14 illustrates yet another example of visualizing inter-rack communication. At 1402, an incoming arrow (e.g., color coded red) shown as coming from "outside" the current rack 1404. FIG. 15 illustrates still yet another sample of visualizing inter-rack communication. At 1502, in response to a user selecting a node to view the transfers, the transfers are shown from the selected node as highlighted, e.g., shown at 1504, which may be highlighted with color, e.g., yellow. FIG. 16 illustrates yet another example of visualizing inter-rack communication. For example, communication between the nodes in different racks may be shown as arcs 1602 on the right side of the visualization screen.

Figure 17:
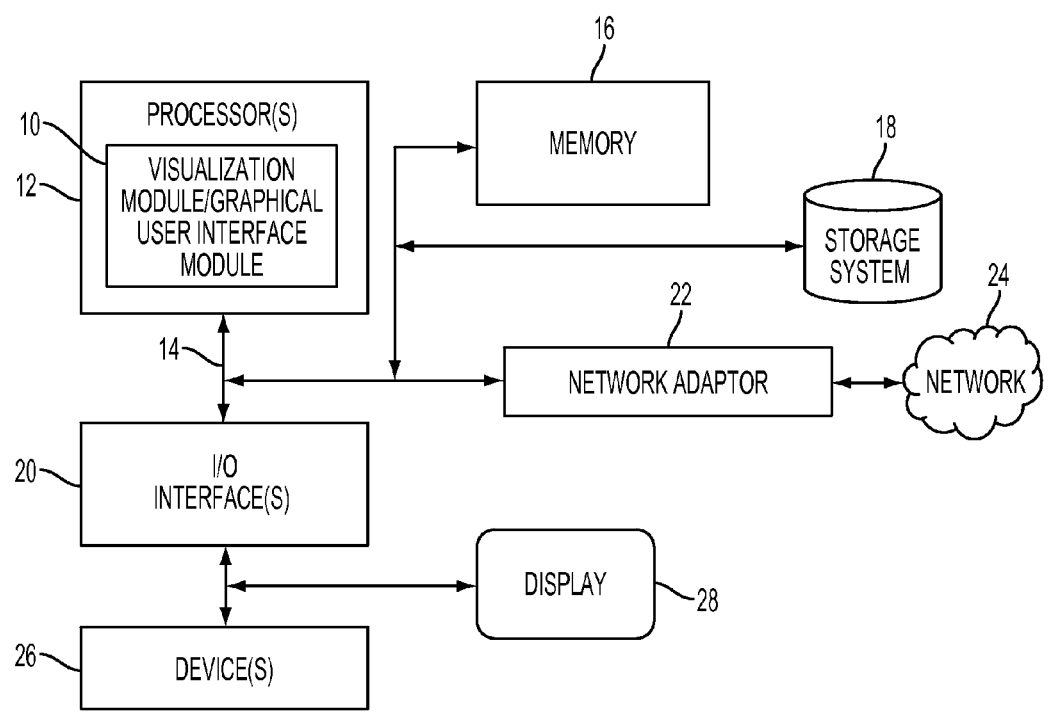
FIG. 17 illustrates a schematic of an example computer or processing system that may implement the system in one embodiment of the present disclosure.

FIG. 17 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 17 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a visualization module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of visualizing data transfers in a distributed computing environment, comprising:
    receiving information associated with the data transfers comprising at least information associated with a plurality of nodes in the distributed computing environment; and
    visualizing, by a processor, the plurality of nodes in the distributed computing environment, a node in the plurality of nodes represented as a geometrical shape, a first part of the geometrical shape representing logic of the node and a second part of the geometrical shape representing storage of the node, wherein a line connecting the first part and the second part represents data transfer between the first part and the second part, and wherein a spline connecting two of the geometrical shapes each of which represents a different node in the plurality of nodes, represents inter-node data transfer between logic and storage of said two different nodes.

2. The method of claim 1, wherein the plurality of nodes is organized and visualized as a matrix wherein each row of the matrix contains nodes in a rack in the distributed computing environment.

3. The method of claim 2, wherein data transfer between two nodes of different racks are visualized as a spline between said two nodes of different racks drawn outside the matrix.

4. The method of claim 1, wherein the plurality of nodes is organized and visualized as a circular layout wherein data transfer within a node of the plurality of nodes is presented as a radial line between the first part and the second part of the node.

5. The method of claim 4, wherein data transfer between two nodes of the plurality of nodes in a same rack in the distributed computing environment is presented as a spline between two geometrical shapes representing the two nodes and shown along the circular layout.

6. The method of claim 4, wherein data transfer between two nodes of the plurality of nodes in different racks in the distributed computing environment is presented as a spline between two geometrical shapes representing the two nodes and shown inside the circular layout.

7. The method of claim 1, wherein the geometrical shape is a rectangle, the first part and the second part are smaller rectangles shown inside the geometrical shape.

8. The method of claim 1, wherein a thickness of the line represents an amount of the data transfer.

9. The method of claim 1, wherein a size of the first part or the second part represents an amount of data transferred or to be transferred.

10. The method of claim 1, wherein the information comprises at least a type of data transfer, wherein different types of data transfers are shown in different colors in a single visualization.

11. The method of claim 1, wherein the data transfers comprise Hadoop Distributed File System (HDFS) writes, HDFS reads, or HDFS shuffles, or combinations thereof.

12. The method of claim 1, wherein the data transfers represent financial flows within one or more departments of an organization, between said departments, or between a plurality of organizations, or combinations thereof.

13. The method of claim 1, further comprising:
    allowing interaction with the visualized data transfers among the plurality of nodes.

14. The method of claim 13, wherein the interaction comprises filtering the data transfers for the visualizing according to a criterion.

15. The method of claim 13, wherein the interaction comprises displaying statistics associated with the data transfers.

16. The method of claim 13, wherein the interaction comprises pattern extraction.

* * * * *